(12) United States Patent
Kondamuri et al.

(10) Patent No.: US 11,750,624 B2
(45) Date of Patent: Sep. 5, 2023

(54) STATISTICAL APPROACH FOR AUGMENTING SIGNATURE DETECTION IN WEB APPLICATION FIREWALL

(71) Applicant: VMware, Inc., Palo Alto, CA (US)

(72) Inventors: Chandra Sekhar Kondamuri, San Jose, CA (US); Abhijeet Joglekar, Sunnyvale, CA (US); Brian Sonnenberg, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 1007 days.

(21) Appl. No.: 16/449,068

(22) Filed: Jun. 21, 2019

(65) Prior Publication Data

US 2019/0394216 A1    Dec. 26, 2019

Related U.S. Application Data

(60) Provisional application No. 62/688,787, filed on Jun. 22, 2018.

(51) Int. Cl.
*H04L 9/40* (2022.01)
*G06F 16/2458* (2019.01)
*G06F 16/955* (2019.01)
*G06F 16/25* (2019.01)
*G06N 7/01* (2023.01)

(52) U.S. Cl.
CPC ...... *H04L 63/1416* (2013.01); *G06F 16/2468* (2019.01); *G06F 16/258* (2019.01); *G06F 16/955* (2019.01); *G06N 7/01* (2023.01)

(58) Field of Classification Search
CPC ............. H04L 63/1416; H04L 63/1425; H04L 63/168; H04L 63/02; G06F 16/2468; G06F 16/258; G06F 16/955; G06N 7/005; G06N 7/02
See application file for complete search history.

(56) References Cited

U.S. PATENT DOCUMENTS

| | | |
|---|---|---|
| 7,543,052 B1 | 6/2009 | Klein |
| 7,624,084 B2 | 11/2009 | Chesla |
| 8,079,080 B2 | 12/2011 | Borders |
| 8,151,341 B1 | 4/2012 | Gudov et al. |

(Continued)

FOREIGN PATENT DOCUMENTS

WO    2019246573 A1    12/2019

OTHER PUBLICATIONS

Author Unknown, "Sørensen-Dice Coefficient," Jun. 1, 2018, 4 pages, Wikipedia, retrieved from https://en.wikipedia.org/w/index.php?title=S%C3%B8rensen%E2%80%93Dice_coefficient&oldid=843899050.

(Continued)

*Primary Examiner* — Beemnet W Dada
(74) *Attorney, Agent, or Firm* — ADELI LLP

(57) ABSTRACT

In an embodiment, a statistical approach for augmenting signature detection in a Web application firewall includes receiving a new request including a parameter in a uniform resource identifier (URI), tokenizing the new request, and determining a compound probability that tokens in a value that is associated with the parameter of the URI and that is included in the new request are associated with an attack. The compound probability is determined based at least in part on component probabilities of tokens of historical values associated with the parameter of the URI.

17 Claims, 4 Drawing Sheets

(56) References Cited

U.S. PATENT DOCUMENTS

| | | | |
|---|---|---|---|
| 8,180,886 B2 * | 5/2012 | Overcash | H04L 63/1425 709/227 |
| 8,214,497 B2 | 7/2012 | Alperovitch et al. | |
| 8,635,690 B2 * | 1/2014 | Alperovitch | H04L 51/212 726/13 |
| 8,931,043 B2 | 1/2015 | Cooper et al. | |
| 9,313,175 B2 | 4/2016 | Harrison | |
| 9,483,286 B2 | 11/2016 | Basavaiah et al. | |
| 9,519,775 B2 * | 12/2016 | Sridhara | H04L 63/1433 |
| 9,619,651 B1 | 4/2017 | Leavy et al. | |
| 9,619,965 B1 * | 4/2017 | Hill | G07F 17/3227 |
| 9,717,992 B2 | 8/2017 | Harris et al. | |
| 10,880,270 B1 * | 12/2020 | Rigor | H04L 63/1458 |
| 11,201,855 B1 | 12/2021 | Kondamuri et al. | |
| 2003/0012372 A1 * | 1/2003 | Cheng | H03M 13/2957 380/28 |
| 2008/0082662 A1 | 4/2008 | Dandliker et al. | |
| 2009/0044271 A1 | 2/2009 | Benameur et al. | |
| 2013/0174267 A1 | 7/2013 | Kass | |
| 2013/0254150 A1 | 9/2013 | Harrison et al. | |
| 2015/0020152 A1 | 1/2015 | Litichever et al. | |
| 2016/0050132 A1 | 2/2016 | Zhang | |
| 2017/0104630 A1 | 4/2017 | Shelton et al. | |
| 2017/0149631 A1 | 5/2017 | Brown et al. | |
| 2017/0330096 A1 | 11/2017 | Gupta et al. | |
| 2018/0332060 A1 | 11/2018 | Johnson et al. | |
| 2018/0375784 A1 * | 12/2018 | Balakrishnan | H04L 47/627 |
| 2020/0012784 A1 | 1/2020 | Orihara et al. | |

OTHER PUBLICATIONS

Graham, Paul, "A Plan for Spam," Aug. 2002, 12 pages, retrieved from http://www.paulgraham.com/spam.html.

Non-published commonly owned International Patent Application PCT/US2019/038565, filed Jun. 21, 2019, 26 pages, AVI Networks.

PCT International Search Report and Written Opinion of Commonly Owned International Patent Application PCT/US2019/038565, dated Aug. 29, 2019, 10 pages, International Searching Authority (USA).

Non-Published Commonly Owned U.S. Appl. No. 17/548,527, filed Dec. 11, 2021, 39 pages, VMware, Inc.

* cited by examiner

STATISTICAL APPROACH FOR AUGMENTING SIGNATURE DETECTION IN WEB APPLICATION FIREWALL

CROSS REFERENCE TO OTHER APPLICATIONS

This application claims priority to U.S. Provisional Patent Application No. 62/688,787 entitled A STATISTICAL APPROACH FOR AUGMENTING SIGNATURE DETECTION IN WEB APPLICATION FIREWALL filed Jun. 22, 2018 which is incorporated herein by reference for all purposes.

BACKGROUND OF THE INVENTION

A Web application firewall (WAF) is an application layer firewall that protects computer systems from attacks. A conventional firewall monitors, filters, and blocks HTTP traffic to and from a web application using layer 3 and layer 4 information of a TCP/IP stack. For example, the Web application firewall inspects HTTP transactions and determines whether to service the HTTP traffic such as forwarding the request to a backend server. A Web application firewall parses the HTTP traffic using rule-based logic or signature-matching to detect and prevent attacks. Typically rules and signatures (pieces of code known to be malicious) are stored in a database. As HTTP traffic comes in, the Web application matches parts of the traffic to the rules or signatures. As attacks become more sophisticated and malicious actors become more creative, Web application firewalls may need intensive computing resources to accurately and efficiently prevent cyber-attacks.

BRIEF DESCRIPTION OF THE DRAWINGS

Various embodiments of the invention are disclosed in the following detailed description and the accompanying drawings.

DETAILED DESCRIPTION

Figure 2:
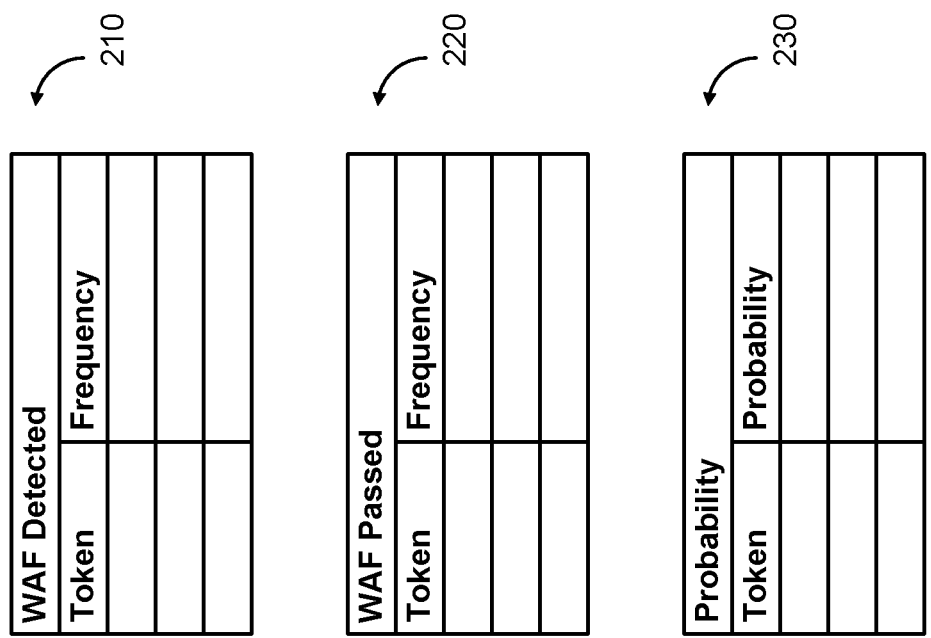
FIG. 2 shows examples of data structures that store tokens from requests.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A conventional Web application firewall (WAF) typically examines an HTTP transaction by identifying signatures in the HTTP transaction. A signature is a piece of code known to be malicious, so finding a matching or similar signature in an HTTP transaction indicates that the HTTP transaction is an attack on the system. A developer typically creates a conventional Web application firewall by writing rules using regular expressions that capture known attack signatures. Usually these rules are not flexible because the regular expressions forming the rules are deterministic and the result is binary. If there is a match to a signature as defined by the regular expression then there is an attack and if there is no match then there is no attack. However, attackers may be constantly exploring avenues to evade detection by the Web application firewall. For example, attackers may expand or alter HTTP payloads to evade detection by the rules. Thus, conventional Web application firewalls may be ineffective against sophisticated attacks that are able to evade rules made by conventional techniques.

In an SQL injection attack, an attacker inserts a malicious SQL statement into an entry so that when the SQL statement is executed the attacker accesses or corrupts database contents. For example, consider the following example SQL injection attack prevention rule:

```
SecRule
REQUEST_COOKIES|REQUEST_COOKIES_NAMES|REQUEST_FILENAME|ARGS_NAMES
|ARGS| XML:/* "(?i:\bunion\b.{1,100}?\bselect\b)"
```

The rule has a regular expression, which is highlighted in the example above. This regular expression logic performs a case-insensitive search for the words "union" and "select" within 100 characters of each other. A firewall programmed with this rule will prevent attack probes in which "union" and "select" are within 100 characters of each other. However, the rule will not prevent attacks where there are more than 100 characters separating "union" and select." Thus, an attacker can try various combinations and SQL statements to avoid detection by the rule. In the following example payload, the attacker has spaced out "union" and "select" so that they are over 100 characters away from each other and a conventional firewall will not detect this attack.

---

UNION %23foofoofoofoofoofoofoofoofoofoofoofoofoofoofoofoo foofoofoofoofoofoofoofoofoofoofoofoofoofoofoo*/*bar%0A SELECT 1,2,current_user DIV 1

---

In this example payload, the attack formulates an SQL statement that is able to evade the regular expression logic of the rule above because the SQL statement has padding between the "union" and "select" keywords. The highlighted portion of the payload above are the characters between "union" and "select," and the SQL injection is URL encoded so the %23 preceding "foofoo . . . " means that there is a comment until the new line indicated by %0A. There are 113 characters between "union" and "select," so a firewall programmed with the rule above (100 characters between "union" and "select") will not catch this attack. The example payload is also functionally equivalent to other ones because the padding between "union" and select" is SQL comment text. Thus, the SQL injection attack is able to bypass the regular expression logic of the example rule described above. This type of attack can be prevented using the techniques disclosed herein.

Techniques for a statistical approach for augmenting signature detection in a Web application firewall are disclosed. The history of parameter values sent by a client (who may be an attacker) is used to determine whether a current/new request is a potential attack. The history of parameter values sent by a client is evaluated and tracked by applying signature rules to determine whether a request containing the parameter values is associated with an attack. Requests can be evaluated as they come in by storing parameter values and whether they are associated with an attack (detected by the Web application firewall) or not (passed by the Web application firewall).

In an embodiment, a method for augmenting signature detection includes receiving a new request including a parameter in a uniform resource identifier (URI), tokenizing the new request, and determining a compound probability that tokens in a value associated with the parameter (of the URI) and included in the new request are associated with an attack. The compound probability is determined based on component probabilities of tokens of historical values associated with the parameter and indicates the probability that the request is an attack. In various embodiments, the historical values include parameter values sent by the client and detected/passed by existing signatures. For example, a parameter value that is detected by existing signatures (detected by the firewall) is considered bad (suspicious). Otherwise, if the parameter value is not detected by existing signatures (passed by the firewall), the parameter is considered good (not suspicious).

Figure 1:
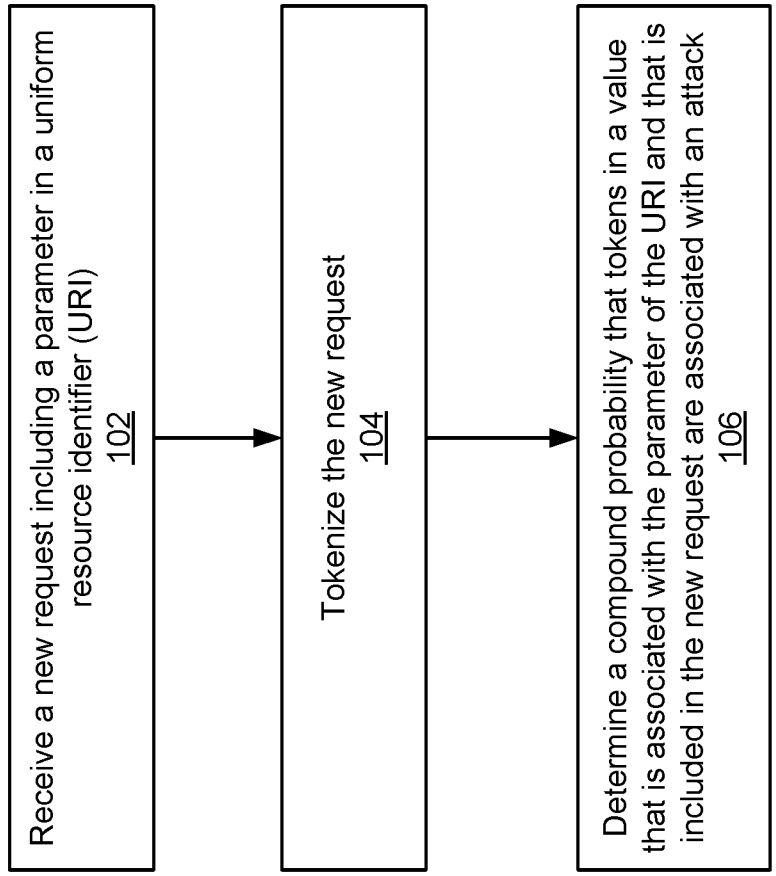
FIG. 1 is a flowchart illustrating an embodiment of a process for augmenting signature detection in a Web application firewall.

FIG. 1 is a flowchart illustrating an embodiment of a process for augmenting signature detection in a Web application firewall. The process can be performed by a service engine and/or a controller such as the ones shown in FIG. 5. For example, a service engine is configured to receive traffic (requests), extract the parameters, tokenize the parameters, and determine a probability of attack. A central controller is configured to formulate one or more statistical rules based on the traffic observed and probabilities determined by the service engines. The service engines then obtain (e.g., look up or receive) the statistical rule(s) and apply the rule(s) to subsequent incoming traffic. As another example, the service engine reports a frequency of tokens for a parameter to a controller. The controller aggregates the frequencies for all service engines, computes the combined frequency, and publishes this information to the service engines. The service engine uses the information received from the controller to evaluate subsequent request to determine the probability that the request is an attack.

The process begins by receiving a new request including a parameter in a uniform resource identifiers (URI) (102). In other words, the new request has one or parameters in the URI. The request can be processed using URI decoding to decode URI-encoded characters. SQL statements are typically encoded to transform special characters into a form that can be transmitted over the internet. For example, in the example payload above URL encoding changed an SQL comment character "#" to "%23." URI decoding converts the "%23" back to "#".

In various embodiments, the request is scrubbed to remove comments, digits, and other elements or characters. What gets removed can be pre-determined or defined by a user. For example, comments such as SQL/HTML style comments like the one in the example payload above may be used to evade attack, so comments and other types of payload elements that can be used to pad the payload are removed. In various embodiments, digits are removed or suppressed (e.g., keep a single digit) from parameter values because they might not add significance for purposes of detecting attacks. In other words, digits are equally good and bad so they do not help to indicate one way or another whether a request is good or bad.

The process tokenizes the new request (104). More specifically, the process tokenizes value(s) of parameter(s) in the request. The process parses the new request using delimiters such as a space, new line, etc. to convert a phrase (sentence) into words (strings or tokens). By way of non-limiting example, delimiters include: space (SPC), TAB, carriage return (CR), ",", ":", "@", "/", "?," etc. Tokenizing breaks the request down into constituent tokens, which are the attributes or values of the request. The tokens can be analyzed to compile statistics about the tokens such as frequency of appearance and probabilities that the token indicates an attack.

In various embodiments, the process applies signature rules to determine whether the request is associated with an attack. As described above, a signature is a piece of code known to be malicious, so finding a matching or similar signature in an HTTP transaction indicates that the HTTP transaction is an attack on the system. If a request meets the conditions of the rule then tokens making up the parameter for that request is recorded as being associated with a bad request. Conversely, if a request passes the firewall, then the tokens making up that request is recorded as being associated with a good request. As more data is collected about a token, the information can be used to calculate the probability that the token is associated with an attack. For example, if the token "foo" is associated with bad requests more often than good requests, then when a new request containing "foo" (or a similar token as further described below) comes in, that request is likely an attack and blocked.

Figure 4:
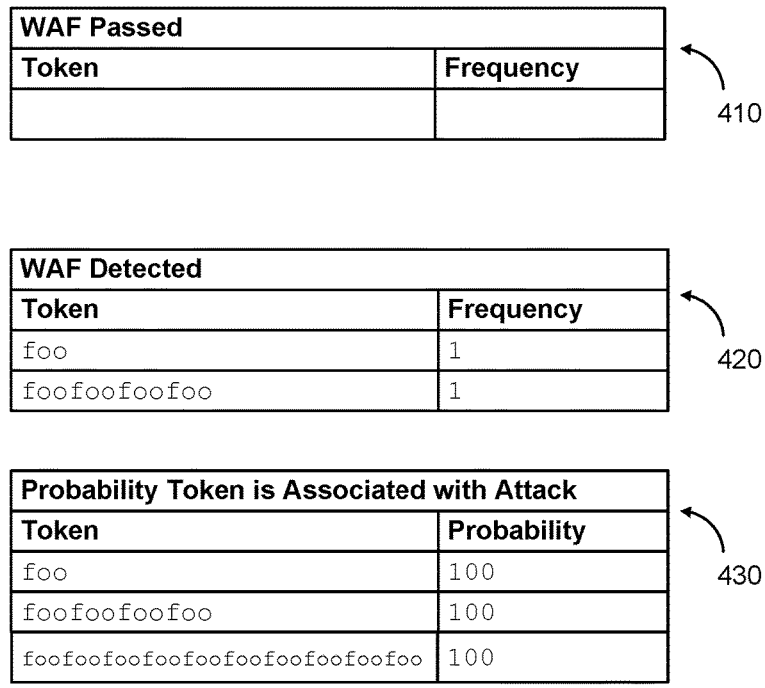
FIG. 4 shows examples of tables storing the frequencies of token passing a Web application firewall, failing (being detected by) a Web application firewall, and the probabilities that a token is associated with an attack.

FIG. 2 shows examples of data structures that store tokens from requests. The examples here are tables but this is not intended to be limiting and other types of data structures can be used. Separate tables can be maintained for URI/Parameter Name combinations. For simplicity the associated URI and Parameter Name are not identified here, but tables 210, 220, and 230 can be for a specific URI and Parameter Name. Also for simplicity the token values, frequencies, and probabilities are left blank. An example of a populated table is shown in FIG. 4.

The Web application firewall (WAF) Detected table 210 stores tokens associated with requests that are detected by the firewall as potential attacks. The Web application firewall (WAF) Detected table 220 stores tokens associated with requests that are not deemed malicious by the firewall. If it is the first time that a token is seen, the token is added to one of the tables 210 and 220 depending on if the request (where the token came from) is good or bad as detected by signature rules. If the token has appeared before, then the frequency associated with the token is incremented in the appropriate table. If a request does not meet the conditions of the rule then the corresponding tokens/frequency are stored in table 210. If a request passes the firewall then the corresponding tokens/frequency are stored in table 220.

The information stored in tables 210 and 220 can be used to determine a probability of a token being associated with a bad request (an attack). The probability of a token being part of an attack payload is stored in table 230. The probability of a token being part of an attack payload is given by its frequency of appearance in the detected table 210 and passed table 220 as captured by example Equation 1 below.

Returning to FIG. 1, after tokenizing, the process calculates the probability of a token appearing in an attack, for example using Equation (1):

$$P(\text{token in attack payload}) = \frac{\text{Frequency\_Detected}}{\text{Frequency\_Detected} + K * \text{Frequency\_Passed}} \quad (1)$$

where Frequency_Detected is the frequency that the token was caught by the firewall (e.g., appears in the WAF Detected table 210), Frequency_Passed is the frequency that the token passed the firewall (e.g., appears in the WAF Passed 220), and K is a tunable value. For example, selecting K=2 is expected to have bias towards passed requests. The probability calculations can be performed in real time or near real time as requests come in. Alternatively, the probability calculations can be performed periodically.

In some embodiments, when a new parameter value clears the signature detection rules, the parameter value is checked against historic attack payloads to see if there is any relationship to earlier attacks, e.g., whether a similar attack has been seen in the past.

The process determines a compound probability that tokens that are in a value associated with the parameter (of the URI) and that are included in the new request are associated with an attack (106). The compound probability is determined based on component probabilities of tokens of historical values associated with the parameter. A component probability is the probability of a specific single token being part of an attack, and can be determined as follows. The compound probability is an overall or combined probability calculated by finding the combined probability for all the tokens in the value associated with the parameter (in some embodiments, assuming independent and no correlation):

$$P(\text{tokens in attack payload}) = \frac{\prod P(\text{each token in attack})}{\prod P(\text{each token in attack}) + \prod [1 - P(\text{each token in attack})]} \quad (2)$$

If the calculated combined probability is greater than a pre-definable threshold (e.g., 0.8), then this request is classified as a potential attack parameter, in various embodiments.

In various embodiments, a random error can be added to the calculated probability to model real world behavior. Errors are typically Gaussian in nature. That is, a random error can be generated from the Gaussian distribution. For example:

$$p(x) = \frac{1}{\sqrt{2\pi\sigma^2}} \exp\left(-\frac{(x-\mu)^2}{2\sigma^2}\right) \quad (3)$$

In various embodiments, a random error multiplied with some bound (say 10%) is added to the probability examples described above. A random Gaussian-distributed error is added into the probability to reflect the expectation that the overall error for all packets should follow a Gaussian distribution.

In various embodiments, historic information about tokens that are similar to each other but not an exact match can be used. In other words, a similarity measure such as fuzzy search can be used to determine which token histories are used. This can prevent attacks where the attacker is slightly altering a parameter (token) to try to evade attack detection.

The similarity of tokens can be measured using a fuzzy search. For example "foofoo" is similar to "foofoofoo," so the calculated probabilities for one might be useful in evaluating the other if they are determined to be sufficiently similar. The history of similar tokens can be used to calculate probabilities of other similar tokens.

One way to perform a fuzzy search is using a Sørensen-Dice coefficient. Given two sets, X and Y, the sets are split into bigrams which are two characters. The following equation can be applied to obtain a set of similar strings:

$$DSC = \frac{2|X \cap Y|}{|X| + |Y|} \quad (4)$$

where |X| and |Y| are the cardinalities of the two sets (the number of elements in each set). The DSC measures the extent of overlap between the two sets. Equation (4) is for a general set. More specifically for strings, the coefficient may be calculated for two strings, x and y using bigrams as follows:

$$s = \frac{2n_t}{n_x + n_y} \quad (5)$$

where $n_t$ is the number of character bigrams found in both strings, $n_x$ is the number of bigrams in string x and $n_y$ is the number of bigrams in string y. The closer the co-efficient is to 1, the more similar the strings are. Equation (5) is for a sting set. In some embodiments, instead of bigrams, trigrams which are three characters are used and the coefficient can be similarly computed.

In various embodiments, a client's reputation can be considered. The client reputation can be combined with the probability determinations described above. For example, if a client is historically a bad actor, the request can be dropped even though the probability does not meet a drop threshold. As another example, if a client is a good actor, the request can be passed if the probability is not clearly indicating a bad request.

Client (user) history can be maintained. In various embodiments, a data structure such as a table is maintained to store client history. For example:

| Client Real IP + User Agent | Number of Good requests | Number of Bad Requests |
|---|---|---|
| 10.10.10.10 + Chrome | 990 | 10 |
| ... | ... | ... |

The conditional client reputation probability of P (Request is Bad/Client) using the example above is 10/990=0.01. This can be combined with the probability of parameter being an attack vector and a final determination about the likelihood of a request being from an attacker can be made. For example, a weighted average of the compound probability described above and the client reputation probability can be used to determine likelihood of an attack.

In various embodiments, after tokenizing the new request and prior to determining a compound probability associated with the new request, the process processes the tokenized request further for example by case converting the tokenized request to be all lowercase. This would catch attackers who attempt to evade rules by simply changing the case of some strings or characters.

The process of FIG. 1 will now be described using the example of FIGS. 3 and 4.

Figure 3:
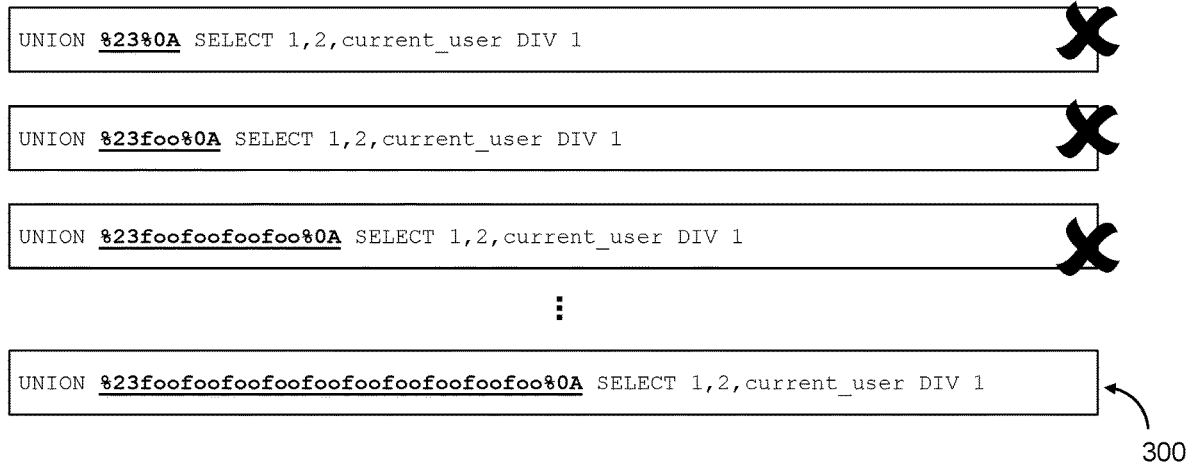
FIG. 3 shows examples of URL encoded SQL statements that are part of potential SQL injection attacks.

FIG. 3 shows examples of URL encoded SQL statements that are part of potential SQL injection attacks. Suppose the rule states that "union" and "select" within 25 characters of each other indicates an attack. In this example, the attacker is attempting to circumvent a rule by sending successive requests with lengthening comments adding more foos each time. FIG. 4 shows examples of tables storing the frequencies of token passing a Web application firewall, failing (being detected by) a Web application firewall, and the probabilities that a token is associated with an attack.

The first three requests are detected by the firewall because "union" and "select" are separated by less than 25 characters. The fourth request is passed by the firewall because "union" and "select" are separated by more than 25 characters. Suppose now a request 300 containing the SQL statement "UNION %23foofoofoofoofoofoofoofoofoofoo %0A SELECT 1,2,current_user DIV 1" is received. The firewall can apply the techniques disclosed herein to determine whether an attack is occurring.

Request 300 includes a single token: foofoofoofoofoo-foofoofoofoofoo. Suppose that using fuzzy search, foo and foofoofoofoo are considered sufficiently similar to foofoo-foofoofoofoofoofoofoo. The probability of token foofoo-foofoofoofoofoofoofoofoo being part of an attack using Equation (1) is 100% because the frequencies of foo and foofoofoofoo are also considered. So Frequency_Detected=2 and Frequency_Passed=0, and assume K=2. This is why table 430 indicates that the probability of foofoofoo-foofoofoofoofoofoofoofoo being associated with an attack is 100%.

In this simple example, the compound probability is the component probability since there is a single token. The result is that a request containing foofoofoofoofoofoofoo-foofoofoo which would conventionally be passed (if only exact matches are considered) is instead assigned a 100% probability of being associated with an attack because of its similarity to other tokens that were associated with an attack. In various embodiments, the accuracy of prediction increases with more observed requests because more data is available.

Suppose the threshold probability to reject a request is 75%, and the threshold probability to consider client reputation is 25%. Suppose the request 300 comes from the same client who sent the first three requests that were rejected. This would cause the client to have a poor reputation score, which may be a tie-breaker and cause request 300 to be rejected.

Figure 5:
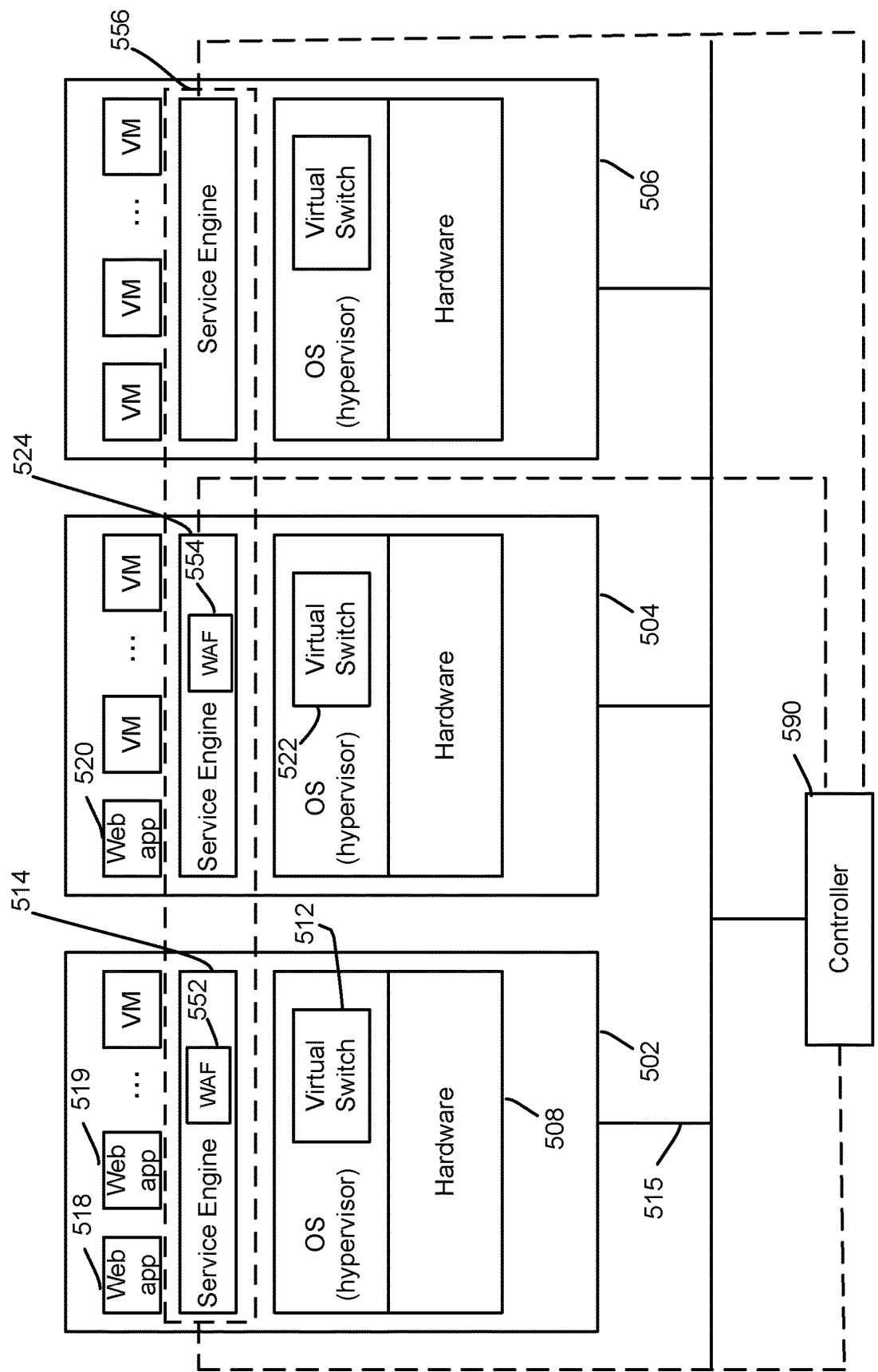
FIG. 5 is a functional diagram illustrating an embodiment of a distributed service platform that provides a web application firewall service.

FIG. 5 is a functional diagram illustrating an embodiment of a distributed service platform that provides a web application firewall service.

In this example, the platform includes a number of servers configured to provide a distributed network service. A physical server (e.g., 502, 504, 506, etc.) has hardware components and software components, and may be implemented using a device such as a processing device 600 of FIG. 6. In particular, hardware (e.g., 508) of the server supports operating system software in which a number of virtual machines (VMs) (e.g., 518, 519, etc.) are configured to execute. A VM is a software implementation of a machine (e.g., a computer) that simulates the way a physical machine executes programs. The part of the server's operation system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®.

In some embodiments, instances of network applications are configured to execute within the VMs. Examples of such network applications include web applications such as shopping cart, user authentication, credit card authentication, email, file sharing, virtual desktops, voice/video streaming, online collaboration, etc. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch (e.g., 512, 522, etc.). A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines (e.g., 514) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. For example, a firewall module is executed to provide Web application security to instances of the target applications on various devices to implement the distributed web application firewall disclosed herein; a load balancer component is executed to provide load balancing logic to distribute traffic load amongst instances of target applications executing on the local physical device as well as other physical devices. Many other service components may be implemented and enabled as appropriate. When a specific service is desired, a corresponding service component is configured and invoked by the service engine to execute in a VM.

In some embodiments, the performance of the target applications is monitored by the service engines, which are in turn monitored by controller 590. In some embodiments, all service engines maintain their own copy of current performance status of the target applications. A dedicated monitoring service engine is selected to send heartbeat signals (e.g., packets or other data of predefined format) to the target applications and update the performance status to other service engines as needed. For example, if a heartbeat is not acknowledged by a particular target application instance within a predefined amount of time, the monitoring service engine will mark the target application instance as having failed, and disseminate the information to other service engines. In some embodiments, controller 590 collects performance information from the service engines, analyzes the performance information, and sends data to client applications for display.

A virtual switch such as 512 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). As will be described in greater detail below, in some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application executes. In some embodiments, a service engine sends data to and receives data from a target application via the virtual switch.

In various embodiments, a service engine includes a tokenizer, scrubber, and case converter (not shown). The service engine uses the tokenizer, scrubber, and case converter to process an HTTP transaction using the process shown in FIG. 1 by parsing the head and body to obtain parameter(s) and associated value(s). The service engine tokenizes the parameters, scrubs comments and digits to remove them, and converts characters to lower case. The service engine then determines a probability for each token being part of an attack. Each service engine can perform independently and push its results to a central controller. In other words, the service engine is configured to receive traffic, tokenize parameter values, determine a probability that the token is associated with an attack, and report results to a central controller. The controller 590 can aggregate results across service engines. For example, the controller can maintain a data structure like the ones shown in FIG. 4 and track the frequencies of tokens that are detected by the firewall, passed by the firewall, and probabilities that a token is associated with an attack across several service engines. In various embodiments, the controller formulates a web application firewall policy that can be applied by the controller and/or the service engines to help process subsequently-received traffic by applying the rule to the traffic to determine whether to allow or block the traffic.

A controller 590 is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof. In some embodiments, the controller is deployed within the VM of a physical device or other appropriate environment. In some embodiments, the controller interacts with client applications to provide information needed by the user interface to present data to the end user, and with a virtualization infrastructure management application to configure VMs and obtain VM-related data. In some embodiments, the controller is implemented as a single entity logically, but multiple instances of the controller are installed and executed on multiple physical devices to provide high availability and increased capacity. In some embodiments, known techniques such as those used in distributed databases are applied to synchronize and maintain coherency of data among the controller instances.

In the example shown, the service engines cooperate to function as a single entity, forming a distributed network service layer 556 to provide services such as distributed web application firewall to the target applications. In other words, although multiple service engines (e.g., 514, 524, etc.) are installed and running on multiple physical servers, they cooperate to act as a single layer 556 across these physical devices. In some embodiments, the service engines cooperate by sharing states or other data structures. In other words, copies of the states or other global data are maintained and synchronized for the service engines and the controller.

In some embodiments, a single service layer is presented to the target applications to provide the target applications with services. The interaction between the target applications and service layer is transparent in some cases. For example, if a load balancing service is provided by the service layer, the target application sends and receives data via existing APIs as it would with a standard, non-distributed load balancing device. In some embodiments, the target applications are modified to take advantage of the services provided by the service layer. For example, if a compression service is provided by the service layer, the target application can be reconfigured to omit compression operations.

From a target application's point of view, a single service layer object is instantiated. The target application communicates with the single service layer object, even though in some implementations multiple service engine objects are replicated and executed on multiple servers.

Traffic received on a physical port of a server (e.g., a communications interface such as Ethernet port 515) is sent to the virtual switch (e.g., 512). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine, based on factors such as configured rules and operating conditions, redirects the traffic to an appropriate target application executing in a VM on a server. The service engine observes and processes the traffic according to the techniques disclosed herein to provide a web application firewall that learns from traffic patterns to prevent attacks on platform components including target applications and backend servers.

Figure 6:
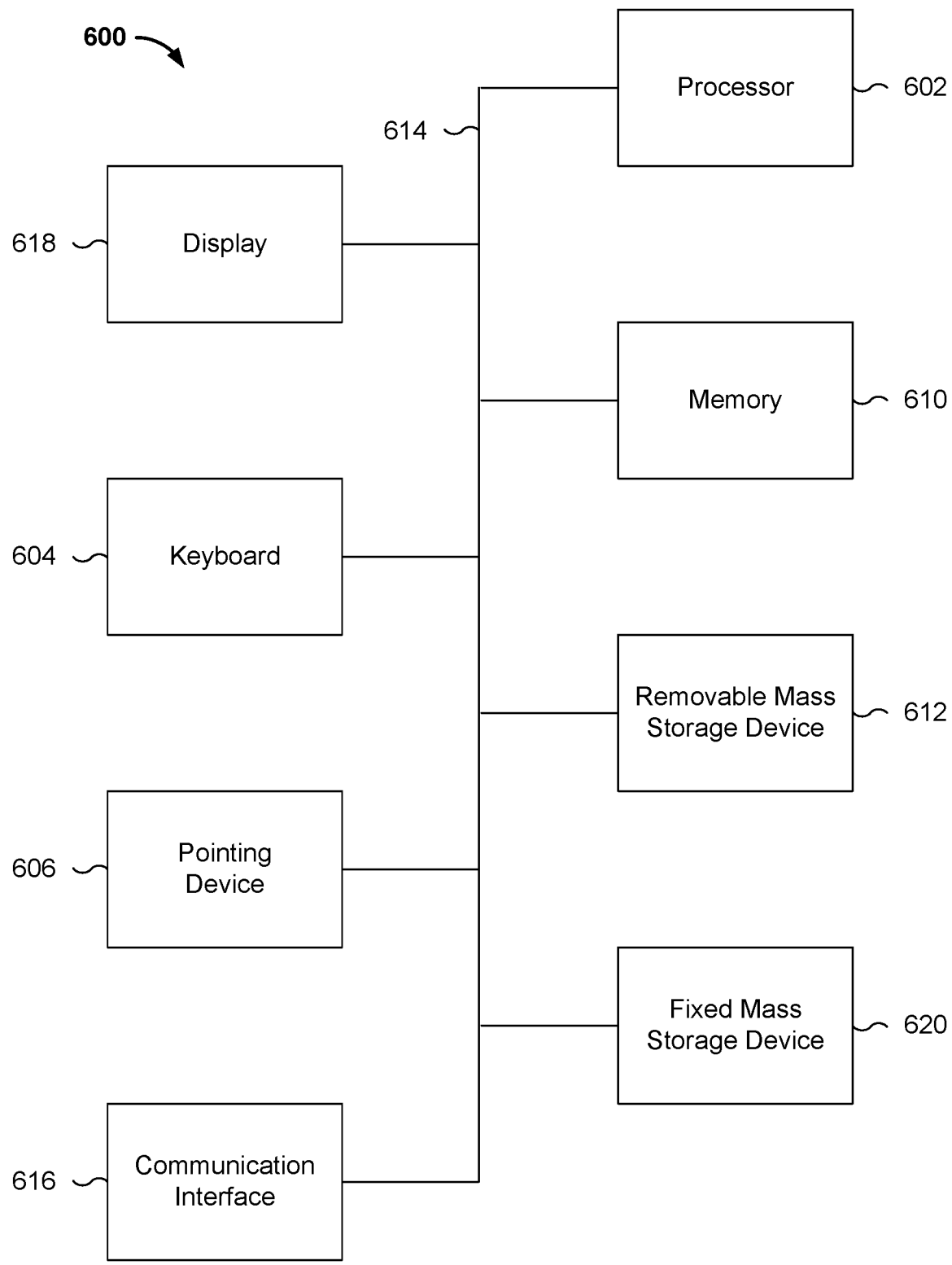
FIG. 6 is a functional diagram illustrating a programmed computer system for implementing a distributed Web application firewall service in accordance with some embodiments.

FIG. 6 is a functional diagram illustrating a programmed computer system for implementing a distributed Web application firewall service in accordance with some embodiments. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, system 600 includes multiple processors 602.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or unidirectional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a communication interface (also referred to as a network interface) 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The communication interface 616 allows processor 602 to be coupled to another computer, computer network, or telecommunications network using a network connection as shown. For example, through the communication interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through communication interface 616. Examples of a communication interface include without limitation external connections, such as a port, cable, wireline, or wireless network interface card, etc., and internal connections such as a communication bus.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The techniques described above augments signature detection in a Web application firewall and thus improves the strength and accuracy of the firewall. In one aspect, false positives are avoided. Maintaining client history (e.g., collecting usage statistics) can have wider applications. As an example, client historical transaction rate as a function of time can be used to confirm/shape the transactions in an adaptive manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing firewall operations for a network based on a dynamic categorization of parameters stored in received packets, the method comprising:
   receiving a first packet comprising a uniform resource identifier (URI) that includes a parameter;
   generating a plurality of tokens from the parameter; and
   computing a compound probability by aggregating component probability computed for each generated token in the plurality of generated tokens, wherein the compound probability expresses whether the plurality of generated tokens is associated with an attack on the network, wherein said computing the compound probability comprises computing the compound probability from a set of one or more probabilities that were computed previously for sets of one or more prior tokens each set of which (i) is generated for a received prior packet and (ii) is similar to the plurality of generated tokens,
   wherein a first component probability for a first generated token is computed from a set of one or more probabilities that were computed previously for a first set of one or more prior tokens each of which (i) is generated for a packet received prior to the first packet and (ii) is similar to the first token,
   wherein a second component probability for a second generated token is computed from a set of one or more probabilities that were computed previously for a second set of one or more prior tokens each of which (i) is generated for a packet received prior to the first packet and (ii) is similar to the second token.

2. The method of claim 1 further comprising dropping the first packet in response to the compound probability being above a threshold.

3. The method of claim 1, further comprising determining whether to drop the first packet based at least in part on a reputation of a client that sent the first packet in response to the computed probability being above a threshold.

4. The method of claim 1, further comprising, prior to generating the token from the parameter, decoding URI encoded characters in the parameter.

5. The method of claim 1, further comprising, prior to generating the token from the parameter, removing comments from the parameter.

6. The method of claim 1, further comprising, prior to generating the token from the parameter, removing SQL- or HTML-style comments from the parameter.

7. The method of claim 1, further comprising, prior to generating the token from the parameter, removing digits from the parameter.

8. The method of claim 1, further comprising, after generating the token from the parameter, converting the token to lowercase.

9. The method of claim 2, wherein the compound probability accounts for random error.

10. The method of claim 1, wherein the first set of one or more prior tokens used for generating the first component probability includes similar tokens as measured by a fuzzy search.

11. The method of claim 1, wherein the first set of one or more prior tokens used for generating the first component probability includes tokens having a similarity measure with the first generated token below a threshold.

12. A system for performing firewall operations in a network, the system comprising:
   a processor configured to:
      receive a first packet comprising a uniform resource identifier (URI) that includes a parameter;
      generate a plurality of tokens from the parameter; and
      compute a compound probability by aggregating component probability computed for each generated token in the plurality of generated tokens, wherein the compound probability expresses whether the plurality of generated tokens is associated with an attack on the network, wherein said computing the compound probability comprises computing the compound probability from a set of one or more probabilities that were computed previously for sets of one or more prior tokens each set of which (i) is generated for a received prior packet and (ii) is similar to the plurality of generated tokens
   wherein a first component probability for a first generated token is computed from a set of one or more probabilities that were computed previously for a first set of one or more prior tokens each of which (i) is generated for a packet received prior to the first packet and (ii) is similar to the first token,
   wherein a second component probability for a second generated token is computed from a set of one or more probabilities that were computed previously for a second set of one or more prior tokens each of which (i) is generated for a packet received prior to the first packet and (ii) is similar to the second token; and
   a memory coupled to the processor and configured to provide the processor with instructions.

13. The system of claim 12, wherein the processor is further configured to, prior to generating the token from the parameter, decode URI encoded characters in the parameter.

14. The system of claim 12, wherein the processor is further configured to, prior to generating the token from the parameter, remove comments from the parameter.

15. The system of claim 12, wherein the processor is further configured to, prior to generating the token from the parameter, remove SQL- or HTML-style comments from the parameter.

16. The system of claim 12, wherein the processor is further configured to, prior to generating the token from the parameter, remove digits from the parameter.

17. A computer program product embodied in a non-transitory computer readable storage medium, the computer program for performing firewall operations for a network and comprising computer instructions for:

receiving a first packet comprising a uniform resource identifier (URI) that includes a parameter;

generating a plurality of tokens from the parameter; and computing a compound probability by aggregating component probability computed for each generated token in the plurality of generated tokens, wherein the compound probability expresses whether the plurality of generated tokens is associated with an attack on the network, wherein said computing the compound probability comprises computing the compound probability from a set of one or more probabilities that were computed previously for sets of one or more prior tokens each set of which (i) is generated for a received prior packet and (ii) is similar to the generated plurality of tokens, wherein a first component probability for a first generated token is computed from a set of one or more probabilities that were computed previously for a first set of one or more prior tokens each of which (i) is generated for a packet received prior to the first packet and (ii) is similar to the first token, wherein a second component probability for a second generated token is computed from a set of one or more probabilities that were computed previously for a second set of one or more prior tokens each of which (i) is generated for a packet received prior to the first packet and (ii) is similar to the second token;

based on the compound probability, determining that the plurality of generated token is associated with an attack; and generating a firewall policy to drop packets that are similar to the received packet.

* * * * *